United States Patent [19]
Fukumori et al.

[11] Patent Number: 5,213,363
[45] Date of Patent: May 25, 1993

[54] HOLLOW WEAVE AIR BAG

[75] Inventors: Kunihiko Fukumori, Takatsuki; Masaharu Yasue, Uji, both of Japan

[73] Assignee: Asahi Kasei Kogyo Kabushiki Kaisha, Japan

[21] Appl. No.: 820,878

[22] PCT Filed: Jun. 7, 1991

[86] PCT No.: PCT/JP91/00770
§ 371 Date: Jan. 30, 1992
§ 102(e) Date: Jan. 30, 1992

[87] PCT Pub. No.: WO91/18768
PCT Pub. Date: Dec. 12, 1991

[30] Foreign Application Priority Data

Jun. 8, 1990 [JP] Japan .................. 2-148502

[51] Int. Cl.⁵ .............................................. B60R 21/16
[52] U.S. Cl. .............................................. 280/743; 383/3
[58] Field of Search ............... 280/743, 728, 730, 731; 383/3, 117, 118, 907; 112/10, 262.1; 428/35.2, 12; 139/384 R, 386, 389, 390

[56] References Cited

U.S. PATENT DOCUMENTS

| | | | |
|---|---|---|---|
| 408,858 | 8/1889 | Seymour | 383/117 |
| 928,642 | 7/1909 | Elliott | 139/389 |
| 3,991,249 | 11/1976 | Yamashita | 139/389 |
| 5,011,183 | 4/1991 | Thornton et al. | 280/743 |

FOREIGN PATENT DOCUMENTS

| | | | |
|---|---|---|---|
| 0363490 | 4/1990 | European Pat. Off. | |
| 5126 | 1/1977 | Japan | 280/731 |
| 54-3484 | 2/1979 | Japan . | |
| 1-254446 | 10/1989 | Japan . | |
| 2-90170 | 7/1990 | Japan . | |
| 225155 | 9/1990 | Japan | 280/728 |
| 56651 | 2/1992 | Japan | 280/728 |

Primary Examiner—Karin L. Tyson
Attorney, Agent, or Firm—Finnegan, Henderson, Farabow, Garrett & Dunner

[57] ABSTRACT

A hollow weave air bag, a configuration of a boundary line between a hollow portion (6) and a peripheral portion (4) of a single layer weave bonding band of which is a curve obtained by that an optional point on an equation $L=R(1+P/2 \times \cos 4\theta)$ draws by changing an angle $\theta$, wherein:

L stands for a length of a straight line between a center (c) of a hollow portion (6) and the boundary line (7);

$\theta$ stands for an angle (radian) formed between a warp axis of a woven fabric and a straight line connecting an optional point (A) on the boundary line to a center (C) of the hollow portion (6);

R stands for a mean value of a radius of a circumscribed circle and a radius of a inscribed circle;

P stands for a ratio of a difference between the radius of the circumscribed circle and the radius of the inscribed circle against the mean radius R;

$0 < P \leq 0.2$

A hollow weave air bag having no sewn portion on the peripheral edge and having an extremely high withstanding pressure and a high reliability can be obtained in accordance with the present invention.

6 Claims, 8 Drawing Sheets

Weave of Part 2

Weave of Part 3

Weave of Part 4a

Weave of Part 4b

HOLLOW WEAVE AIR BAG

DESCRIPTION

1. Technical Field

This invention relates to an air bag. More specifically, the invention relates to a hollow weave air bag for protecting passengers of an automotive vehicle and having a high reliability and a high withstanding pressure.

2. Prior Art

In recent years, air bag systems devices for protecting passengers to prevent the human body from injury caused by collisions, etc., of the automotive vehicle, have been put to actual use and installed in vehicles.

The air bag system comprises a sensor for detecting a collision of the vehicles, a gas generator (inflator) for expanding the bag in response to a signal from the sensor, and an air bag expanded with gas for absorbing any shock imposed on the passenger at the collision.

Accordingly, the air bag has a hollow portion for receiving the gas, an opening for attaching the gas generator, and mechanism for ventilating the gas from the air bag after expansion (for example, a vent hole, or alternatively, it is possible to use the permeability of a fabric of the air bag). Note, to restrict the permeability of the fabric of the air bag and for a reinforcement of the stitched portions, a coating may be provided on the fabric of the air bag.

Such an air bag is formed by initially preparing a woven fabric by employing a high strength synthetic fiber, such as a conventional nylon 66 multifilament and so forth, in the case of the driver's seat, cutting two pieces of woven fabric, sewing the peripheral portions of the two pieces of woven fabric to bind them to each other, and subsequently, providing the opening for attaching the gas generator and the gas ventilating mechanism. It should be noted that, before the sewing, a coating is typically provided on the woven fabric pieces.

It is required that the air bag is able to be expanded by a gas, upon a collision, and to absorb any shock imposed on the passenger during the collision. Accordingly, a high withstanding pressure and a high reliability are required.

Japanese Examined Utility Model Publication (Kokoku) No. 54-3484 disclosed a sewn type air bag in which two circular woven fabric pieces are piled one on the other in such a manner that the warps of the two pieces cross each other at an angle of between 40° and 50°, and the peripheral edges of the two pieces are sewn to improve a withstanding pressure thereof.

Further, Japanese Unexamined Utility Model Publication (Kokai) No. 2-90170 filed on Dec. 28, 1988 and published on Jul. 17, 1990, which is later than the filing date, i.e., Jun. 8, 1990, of Japanese Patent Publication No. 2-148502 from which the present invention claims priority, disclosed a sewn type air bag in which two woven fabric pieces of a square-like shape and having round corners, in which a length between a center of piece and a peripheral portion is longest in a direction inclined from a warp direction and a weft direction of between 40° and 50° are piled, and peripheral portions of the two pieces are bound by sewing or an adhesive to improve the withstanding pressure thereof.

Nevertheless, the conventional known air bags, including the above-mentioned air bags manufactured by binding by sewing or an adhesive, have disadvantages such as a durability of the sewing thread, air leakages due to damage to the woven fabric caused by a sewing needle, and an irregularity of the sewn seam or the like. Further when the binding is applied by using an adhesive, a bound portion thereof becomes extremely hard, and thus problems such as a poor folding property (a poor property hindering the making of the air bag compact), a lower reliability of the binding caused by an irregularity of the adhesive strength or the like, arise. Further, these air bag have another problem of an increased cost brought about by complicated sewing operations or adhesive operations or the like.

Japanese Unexamined Patent Publication (kokai) No. 1-254446 proposed a hollow weave air bag manufactured by binding a peripheral portion by a single layer weave binding band, to solve problems of air bags having a peripheral portion bound by sewing and an adhesive, but the withstanding pressure and the reliability of this hollow weave air bag is not satisfactory.

The construction and problems associated with the above-mentioned hollow weave air bag will be described below with reference to FIGS. 4A, 4B 5A and 5B.

Figure 4A:
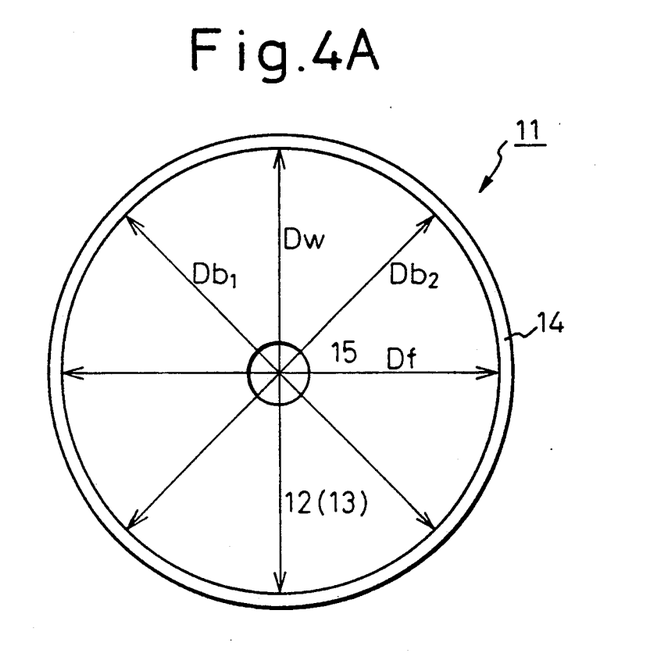
FIG. 4A is a plan view and FIG. 4B is a sectional view.
Figure 4B:
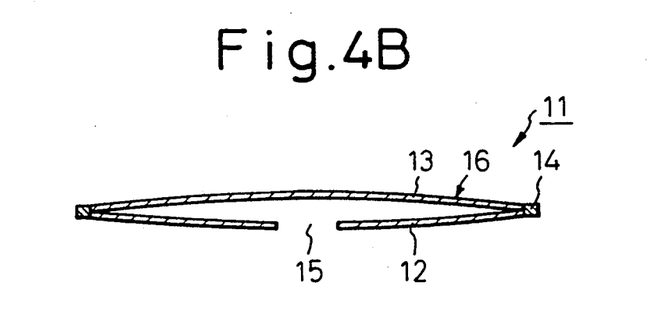

FIG. 4A is a plan view showing an example of the conventional known hollow weave air bag, and FIG. 4B is a sectional view thereof. As shown in FIGS. 4A and 4B, the conventional known hollow weave air bag is constituted of an upper side woven fabric 13 (driver's side when in use) and a lower side woven fabric 12 (steering wheel side when in use), and the peripheral portions 14 of the upper side woven fabric and the lower side woven fabric are formed as a one layer fabric by a single layer weave binding band, whereby a hollow portion 16 is formed between the upper side woven fabric and the lower side woven fabric. A center portion of the lower side woven fabric is provided with an opening 15 for attaching a gas generator.

In the hollow weave air bag 11 shown in FIG. 4B, the peripheral portion is extended outside of the hollow portion, but it is usual to turn the air bag inside-out, using the opening for attaching the gas generator, so that the peripheral portion is arranged inside the air bag (not shown).

The interior of the hollow portion is formed into an essentially circular configuration. Namely, in FIG. 4A, the diameter of the warp direction represented by Dw, the diameter of the weft direction represented by Df, and the diameters of two perpendicularly intersecting bias directions, i.e., the diameters Db1 and Db2 intersecting to the warp and the weft at the angle of 45°, are formed to essentially equal values.

Such a construction of a hollow weave air bag can be manufactured by employing a weaving machine having a jacquard mechanism.

Figure 5A:
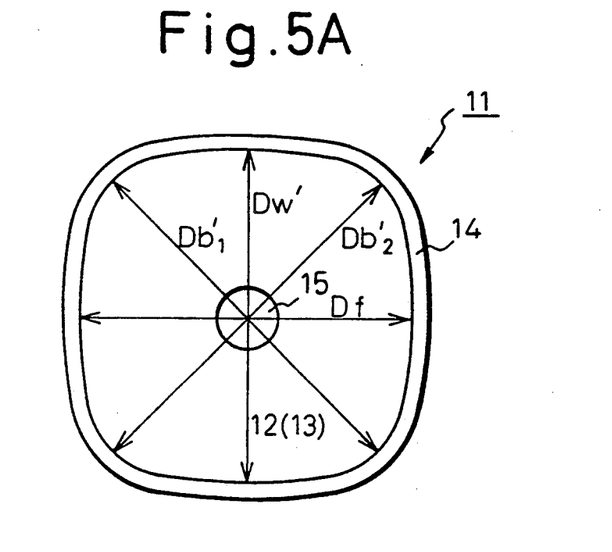
FIG. 5A is a plan view and FIG. 5B is a sectional view.
Figure 5B:
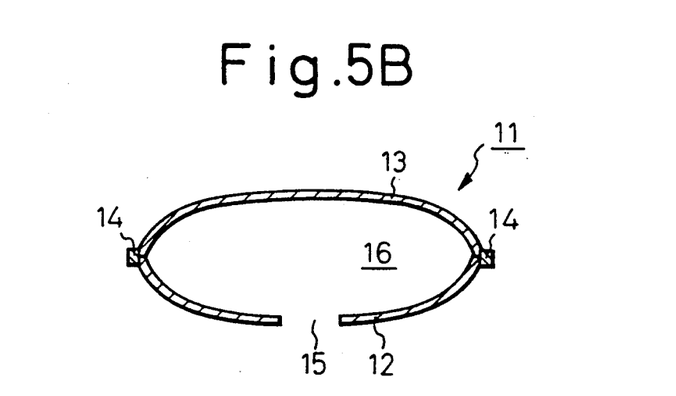

The expanded condition of the hollow weave air bag shown in FIGS. 4A and 4B is shown in FIG. 5A (plan view) and FIG. 5B (section). As is clear from FIGS. 5A and 5B, the hollow portion, which has essentially a circular configuration before expansion, becomes a modified quadrilateral configuration elongated in the directions.

This is considered to be caused by a greater expansion in the bias direction under a certain tension, than in the warp and weft direction, with such a distorted configuration, i.e., the modified quadrilateral configuration of the hollow portion deformed from the circular configuration after expansion, and thus a lowering of the withstanding pressure occurs.

Namely, where the withstanding pressure is lowered according to variations of the configuration of the hollow portion after expansion, the characteristics of the hollow weave air bag may be unpreferably obstructed.

Accordingly, an air bag having the characteristics of the hollow weave air bag and a high withstanding pressure is required.

DISCLOSURE OF THE INVENTION

The object of the present invention is to solve the problems of the conventional known hollow weave air bag and to provide a hollow weave air bag having a construction by which a withstanding pressure is remarkably improved and the reliability is high.

To object of the present invention is attained by a hollow weave air bag having a peripheral portion of a hollow portion bound by a single layer weave binding band, characterized in that a boundary line between the peripheral edge and the single layer weave binding band is formed to have different lengths form a center of the hollow portion to the boundary line, in such a manner that the length is a maximum value in a warp direction and a weft direction of the hollow weave air bag and is a minimum value in a bias direction thereof, and is further formed substantially along an arc-like continuous curve, expressed by the following equation, between a circumscribed circle and an inscribed circle of the boundary line:

$$L = R (1 + P/2 \times cos4\theta) \quad (1)$$

$$0 < P \leq 0.2 \quad (2)$$

wherein R stands for a mean value of a radius' of the circumscribed circle and a radius of the inscribed circle;

P stands for a ratio of a difference between the radius of the circumscribed circle and the radius of the inscribed circle against the mean radius R;

$\theta$ stands for an angle measured in a clockwise direction from the warp direction;

L stands for a length from the center C of the follow portion to the boundary line at the angle $\theta$.

A hollow weave air bag in which the lengths of straight lines within said boundary line, in plan view extending through a center of the hollow portion of the air bag, are substantially equal to each other in a warp direction, in a weft direction and in two bias directions, when said air bag is expanded at an internal pressure of 0.3 kg/cm$^2$, is included in the thus-obtained hollow weave air bag according to the present invention.

The woven fabric of the hollow weave air bag may be used as it is or after a resin coating layer is provided on a whole surface or a part surface of the woven fabric, as an air bag in accordance with a design level of an air permeability of an expanded air bag.

BRIEF DESCRIPTION OF THE DRAWINGS

FIGS. 1A to 1C show a hollow weave air bag according to the present invention, in which

FIGS. 2A and 2B show the air bag shown in FIGS. 1A to 1C in the expanded condition, in which

FIGS. 4A and 4B show a conventional known air bag, in which

FIGS. 5A and 5B show the air bag shown in FIGS. 4A and 4B, in which

FIGS. 8A to 8D is a weave diagram of each part of the single layer weave binding band shown in FIG. 7, in which FIG. 8A is a weave diagram of a part 2, FIG. 8B is a weave diagram of a part 3, FIG. 8C is a weave diagram of a part 4a, and FIG. 8D is a weave diagram of a part 4b.

BEST MODE OF CARRYING OUT THE INVENTION

Figure 3A:
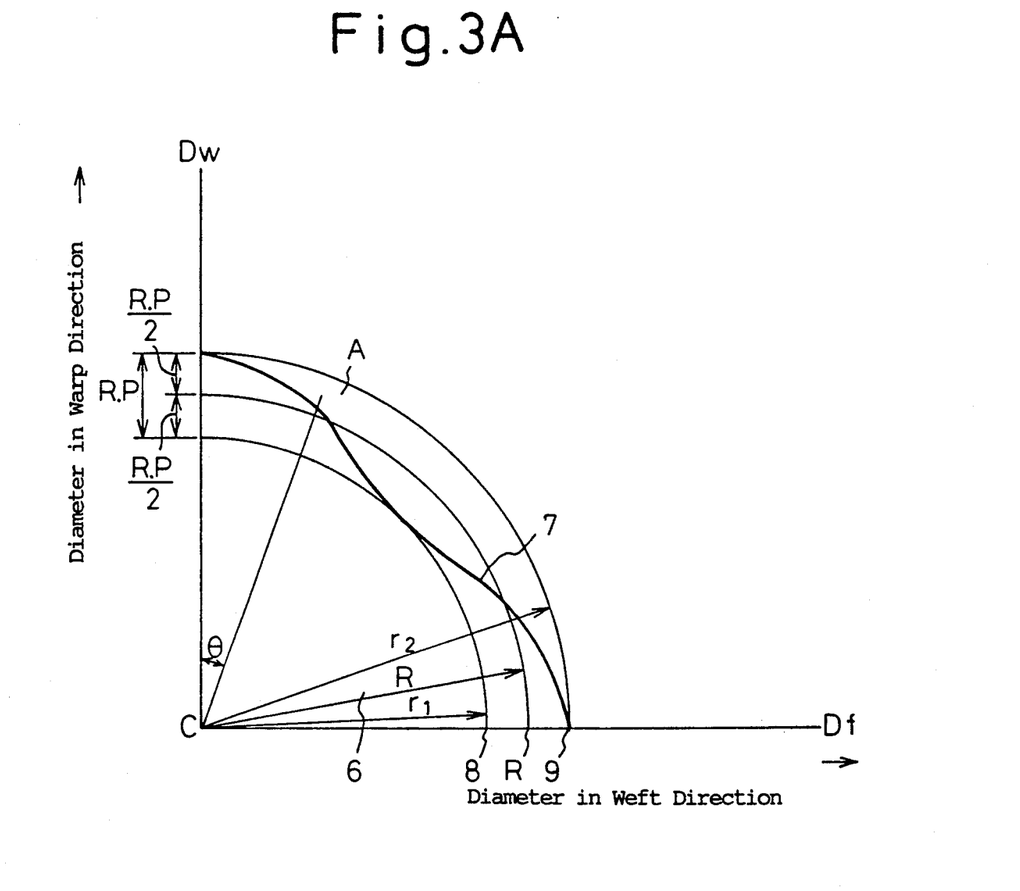
FIG. 3A is a part plan view of a curve showing a configuration of a boundary line between a hollow portion and a single layer weave binding band in the hollow weave air bag according to the present invention.

It is essential to the present invention that a boundary line between a hollow portion and peripheral portion formed by a single layer weave binding band is an arc-like continuous curve obtained by moving a segment from the point c to the boundary line at an angle $\theta$ in FIG. 3A, and drawing a locus expressed by the equation $L = R(1 + P/2 \times cos4\theta)$. When another curve is used, even if the air bag is manufacutured by a hollow weaving method, it is impossible to manufacture an air bag having a high withstanding pressure.

Further it is essential that the value P satisfy a range expressed by the equation $0 < P \leq 0.2$, preferably $0.02 \leq P \leq 0.15$, to balance the dimensions, in the warp direction, the weft direction and the bias direction, and to increase the withstanding pressure. When the value P is equal to 0 or 0.2 or more, the dimensions in the warp direction, the weft direction and the bias direction of the expanded air bag bigger largely, and the obtained air bag becomes a non-circular air bag in which the hollow portion of the air bag is largely distorted, and this results in a lower withstanding pressure thereof. The value P may be optionally selected according to a type of yarn, a yarn density and a weave of the hollow weave woven fabric, a volume of the air bag or the like.

Further, the value R may be optionally determined according to characteristics required of the air bag, such as a volume of the air bag.

The statement that the boundary line is formed substantially formed along the curve defined by the above equation (1) means that the boundary line is formed between a curve defined by the following equation (3) and a curve defined by the following equation (4).

$$L = 0.98R(1 = P/2 \times cos4\theta) \quad (3)$$

$$L = 1.02R(1 + P/2 \times cos4\theta) \quad (4)$$

This is because it is impossible to make the boundary line between the hollow portion and the peripheral portion a gently-sloping curve, in a strict sense, when weaving the hollow portion from very large numbers of warp and weft yarns, on the basis of a weave using a jacquard mechanism.

The present invention will be described with reference to FIGS. 1A to 1B, 2A and 2B, and 3A and 3B showing examples of the hollow weave air bag according to the present invention.

Figure 1A:
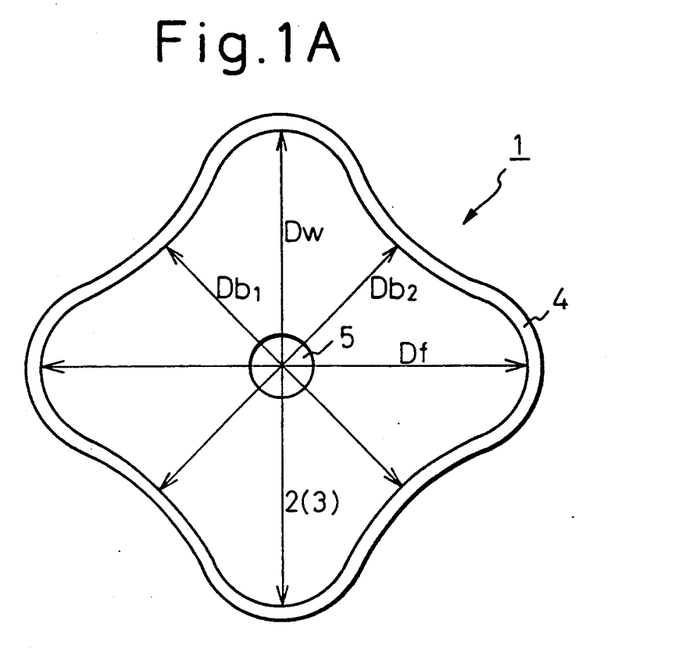
FIG. 1A is a plan view.
Figure 1B:
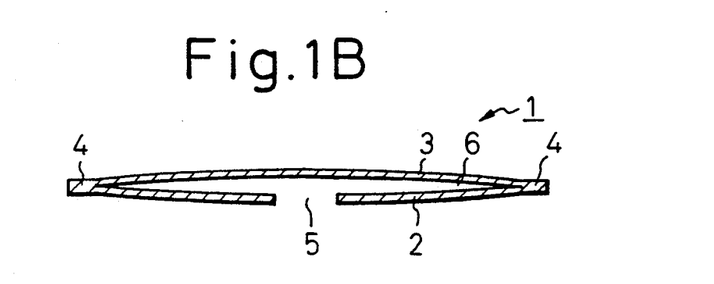
FIG. 1B is a sectional view.
Figure 1C:
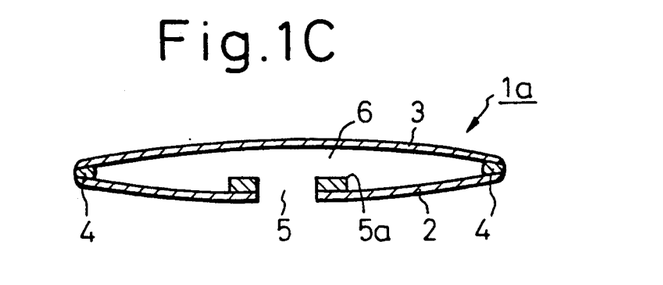
FIG. 1C is a sectional view showing the air bag when turned inside-out by using a gas generator attaching opening in the air bag shown in FIGS. 1A and 1B.

FIG. 3A is a part plan view showing a peripheral portion of the hollow weaving portion of the hollow weave air bag (before expansion) according to the present invention, and corresponds to a one-fourth portion thereof, i.e., a right and upper portion of the whole hollow weave air bag shown in FIGS. 1A to 1C. Namely FIG. 3A shows a double weave forming the hollow portion 6 and the peripheral portion having a single layer weave and woven as a woven fabric portion. In FIG. 3A, an ordinate axis Dw denotes a warp direction of the woven fabric and an abscissa axis Df denotes a weft direction of the woven fabric. A boundary line 7 between the hollow portion 6 and the peripheral portion is a gently-sloping curve having an arc-like continuous curve obtained by moving an optional point A on the boundary line and having a length L from a center thereof, and drawing a locus.

Circles 8 and 9 are concentric circles having a diameter R having a center C of the hollow portion. A radius $r_1$ corresponds to $R(1-P/2)$, and a radius $r_2$ corresponds to $R(1+P/2)$. A length L of a strength line obtained by connecting the point A with the point C is expressed by the equation $L=R(1+P/2 \times \cos 4\theta)$. When the $\theta$ (radian) is equal to 0 and $\pi/2$, i.e., in the warp direction Dw and Df, the above equation becomes an equation $L=R(1+P/2)$; when $\theta$ is equal to $\pi/4$, it becomes an equation $L=R(1-P/2)$, and when $\theta$ is equal to $\pi/8$ and $3\pi/8$, it becomes an equation $L=R$.

Namely, a whole configuration of the boundary line has convex portions in the warp direction and the weft direction and concave portions in the bias direction, i.e., directions having the value $\theta$ of $\pi/4$, $3\pi/4$, $5\pi/4$, and $7\pi/4$.

Figure 2A:
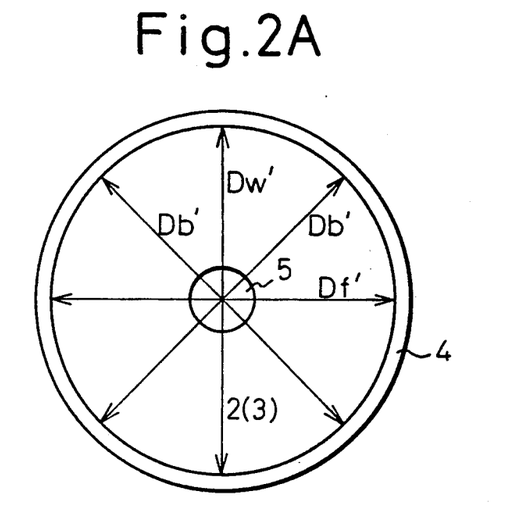
FIG. 2A is a plan view.
Figure 2B:
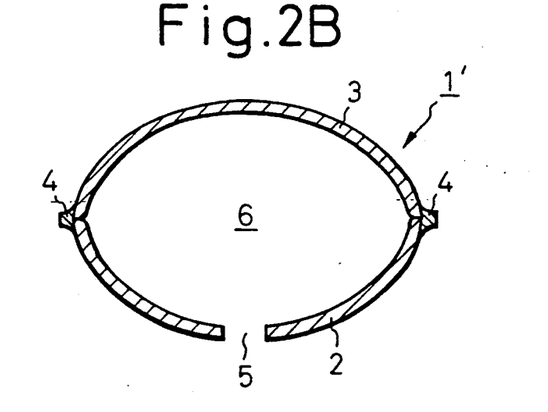
FIG. 2B is a sectional view.

FIG. 1A is a plan view showing an example of the hollow weave air bag according to the present invention and FIG. 1B is a sectional view thereof. FIG. 2A is a plan view of the air bag shown in FIG. 1A in the expanded condition when an air pressure is applied to the hollow portion, and FIG. 2B is a sectional view thereof.

As shown in FIG. 1A, the hollow weave air bag 1 according to the present invention is constituted of two woven fabrics, i.e., an upper side woven fabric 3 and a lower side woven fabric 2, and peripheral portions 4 of the upper side woven fabric and the lower side woven fabric are formed into one woven fabric by a single layer weave. As a result, a hollow portion is formed between the upper side woven fabric and the lower side woven fabric. An opening 5 for attaching an air generator is provided at a center of the lower side woven fabric.

As clearly shown in FIG. 1A, in the hollow weave air bag according to the present invention, the equal lengths of the diameter Dw in the warp direction and of the diameter Df in the weft direction, the shorter diameters Db1 and Db2 in the bias direction, in comparison with the warp and weft directions, and an arc-like continuous and gently-sloping curve are employed.

Although the hollow weave air bag according to the present invention has the hollow portion constituted with the arc-like continuous and gently-sloping curve, a length in the bias direction of which is relatively short before expansion, a configuration of the air bag when a passenger is in contact with the air bag, for example, the air bag is expanded at an internal pressure between 0.2 kgf/cm² and 0.3 kgf/cm², becomes a configuration in which the hollow portion is substantially a circle, when the value P is small, for example the value P satisfies the equation $0 < P \leq 0.08$, and becomes a configuration in which the hollow portion is a non-circle having a length in the bias direction which is slightly shorter, when the value P is large, for example, the value P satisfies the equation $0.08 < P \leq 0.2$.

The withstanding pressure of the air bag is high when the value P is relatively large, but even if the value P is 0.08 or less, the withstanding pressure can be improved. Also, when a vehicle actually collides with another body, even if the steering wheel is not arranged at a normal on neutral position, a configuration of the expanded air bag becomes substantially a circle. Therefore, the air bag according to the present invention has an advantage in that the configuration of the air bag when in contact with the passenger does not depend on a position of the steering wheel.

Figure 3B:
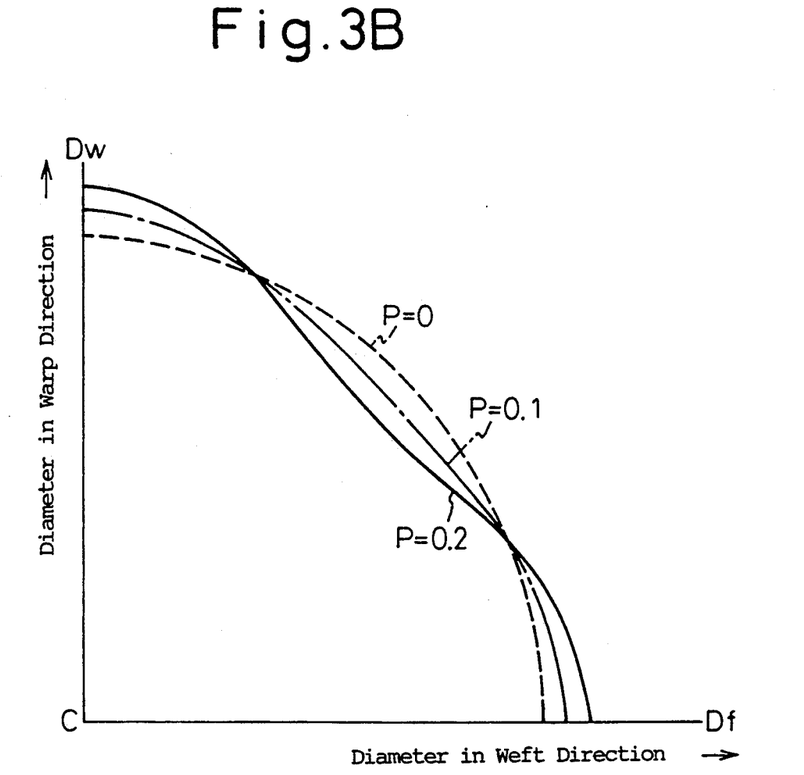
FIG. 3B is a view similar to FIG. 3A when the value of P is changed.

A configuration of the air bag according to the present invention, before the expansion thereof, will be described with reference to FIG. 3B. FIG. 3B is a part plan view of a portion corresponding to a one-fourth portion of a right and upper portion of the hollow weave air bag, as in FIG. 3A. A curve expressed as $P=0$ shows a configuration of a hollow weave air bag having a circular shape and does not belong to the present invention. In the present invention, when the value P is increased, portions arranged on the warp direction axis and the weft direction move outward from the curve, the value P of which is 0, and portions arranged on the bias direction move inward from the curve, the value P of which is 0. When the value P is increased, the portions in the bias direction become gradually plain to see, and when the value P is over 0.1, the portion in the bias direction apparently becomes a concave-like curve. An example of the boundary line having a P value of between 0.1 and 0.2 is shown in FIGS. 1A and 3A.

A width of the single layer weave binding band is determined to be between 5 mm and 50 mm, preferably between 10 mm and 30 mm. When the width is 5 mm or less, a yarn slippage occurs upon an expansion of the air bag, and thus the withstanding pressure is lowered. When the width is 50 mm or more, the air bag become bulky, it becomes difficult to fold the air bag to a compact shape, which results in a poor stowage thereof and a large loss of a raw cloth. Preferably, a constitution of the single layer weave binding band is such that an area adjacent to the boundary line i.e., an inside area thereof, is woven by a weave having a bigger restriction for a yarn, and an outside area from the inside area is woven by a weave having a lower restriction for a yarn.

This is intended to prevent a slippage of the yarn and a leakage of gas when the air bag is expanded, and provides an improved weavingability. A construction of the single layer and a ratio of a weave having a higher restriction and a weave having a lower restriction can be optionally determined according to a type of yarn, a weave, a density or the like to be used.

Through a number of experiments made by the inventors, although there is some fluctuation due to differences in other constructions (such as a use of yarn), an improvement in the withstanding pressure is approximately 25%. Such an improvement of the withstanding pressure contributes not only to an improvement of the reliability of the air bag but also to a reduction of the amount of woven fabric (practically, the weight) necessary for satisfying a required withstanding pressure, and thus contributes to a reduction of the cost of manufacturing the air bag.

The hollow weave air bag according to the present invention and shown in FIGS. 1A and 1B is used in a non-permeability treated form as required. For example, this non-permeability treatment can be attained by applying wholly or partially a resin on both sides or a side of an upper side woven fabric or a lower side woven fabric, by a treating method such as coating, dipping, laminating or the like.

Further, the non-permeability treatment may not be applied when an air bag having a light weight and not having a bulkiness is required. In both cases, the boundary line between the hollow portion and the peripheral portion and having a shorter length in a bias direction must be drawn by an arc-like continuous and gently-sloping curve in a final hollow weave woven fabric.

As shown in the air bag 1a in FIG. 1C, the hollow weave air bag according to the present invention is turned inside-out by using the opening for attaching the gas generator, so that the peripheral portion is placed within the hollow portion. Further, a reinforcement cloth 5a may be attached around the opening for attaching the gas generator. Also, various additional constructions will be used as required for formulating the air bag.

The attaching of the reinforcement cloth, fixing cloth, covering material or the like to the hollow weave air bag can be made by various treating methods, such as sewing by using a sewing machine, molten binding using a high frequency welding, ultrasonic welding or the like, adhesive binding using an adhesive such as a rubber cement, a self adhesive, a hot-melt adhesive or the like or a combination thereof.

A multifilament obtained by melt spinning, dry spinning, wet spinning or the like, a spun yarn, a mixed yarn, a covering yarn a combination yarn thereof or a multifilament textured yarn applied with a bulkiness, can be used as a yarn constituting a bag body and a reinforcement cloth of the hollow weave air bag according to the present invention.

As a material of the yarn used for the bag body and the reinforcement cloth of the hollow weave air bag according to the present invention, for example, a polyamide fiber such as nylon 6, nylon 66, nylon 46 or the like, an aramid fiber, typically a copolymer of a parapheylene terephthalateamid and an aromatic ether, or the like, a polyester fiber typically a polyalkylene phthalate, an aromatic polyester fiber, a vinylon fiber, a rayon fiber, a polyolefin fiber which is of an ultra-high-molecular-weight polyethylene or the like, a polyoxymethylene fiber, a sulfon group fiber which is of a paraphenylene sulfon, a polysulfon or the like a polyether ether keton fiber, a polyimide fiber or the like can be used. Further, an inorganic fiber such as a glass fiber, a ceramic fiber or the like may be used alone or in combination with other fibers.

The material of the above yarn may include any type of conventional additives able to increase productivity in a process of manufacturing the yarn and a processing thereof, and improve the characteristics of the yarn. For example, a heat stabilizer, an antioxidant, a light stabilizer, a smoothing agent, a plasticizer, a thickening agent, a pigment, a lustering agent, a fire retardant or the like may be included in the fiber.

Although the hollow weave air bag according to the present invention is described on the basis of an air bag used for a driver's seat, and which is an example of the hollow weave air bag, it is apparent that the above-described constitution of the present invention can be applied to the air bag used for the passengers front seat, rear seats or door-side seats.

As described above, the hollow weave air bag according to the present invention is, in particular, an air bag capable of absorbing a shock imposed on a passenger due to a collision, and having a superior withstanding pressure. In some cases, however, a hollow weave bag may be applied to the other application in which the hollow weave bag is expanded or developed by an injection or filling of a gas, except a hot gas generated from a gas generator, a liquid, a solid, a powder, a particle, or a combination thereof, and the above applications are within a range of the application of the hollow weave air bag according to the present invention.

EMBODIMENT

Examples of the hollow weave air bag and the conventional known air bag are shown, and in conjunction therewith, a comparison of the performances thereof is made.

Prior to the discussion of the example and the comparative examples, the methods of measuring the withstanding pressure and the volume will be explained.

(1) Withstanding pressure (kg/cm$^2$)

Figure 6:
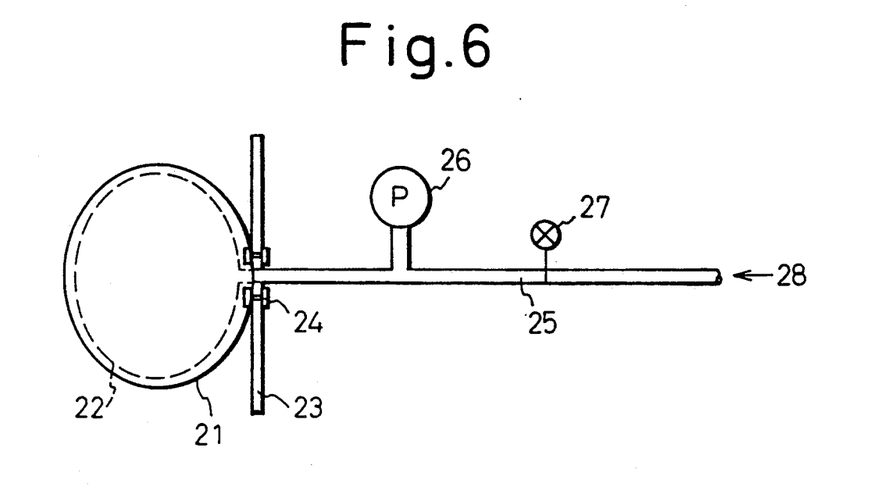
FIG. 6 is an explanatory illustration showing a burst testing apparatus for measuring a withstanding pressure.

Employing the burst test apparatus shown in FIG. 6, an air bag 21, in which is inserted a balloon 22 having a greater volume when expanded, is mounted on the air bag mounting plate 23 by using a fixture 24. Then by means of a pressure adjusting valve 27, an amount of high pressure air 28 supplied through a tube 25 is adjusted to expand both the air bag 21 and the balloon 22. The pressure at the bursting of the air bag 21 is measured by a pressure gauge 26.

(2) Volume

The air bag is dipped in a water bath, to fill the bag with water through the gas generator attaching opening, to thus obtain a filled water amount at a water column of 500 mm as the volume of the air bag.

EXAMPLE 1

A plurality of hollow weave woven fabrics having the constructions shown in FIGS. 1A and 1B were manufactured by a weaving machine with a jacquard mechanism, using nylon 66 multifilament 420 d/70 f. The weaving density was a warp of 92 yarns per inch and a weft of 92 yarns per inch, a single layer weave in a peripheral portion was made a mat weave, and a width thereof was 18 mm.

The weaving conditions were as follows.
Number of dents: 21.1 per inch
Number of warps drawn into the dents: 4
picking density: 86 per inch
Drafting width: 184.7 mm
Finished width: 166.1 mm
Weaving machine: Dornier HTVF4J
Jacquard mechanism: Grosse Unirapid-2
A design of the single layer weave binding band is as follows.

|  | Density of woven fabric (Number per inch) | Density of finished woven fabric (Number per inch) | Weave |
|---|---|---|---|
| Hollow portion | 43 × 43 | 46 × 46 | plain |
| Single layer weave binding band | 86 × 86 | 92 × 92 | Matt |

A configuration of a gently-sloping curve of a boundary line between the hollow portion and the peripheral portion is expressed as an arc-like continuous curve having a locus obtained by moving a segment having a value of L in the equation $L(mm) = 360(1 + 0.12/2 \times \cos 4\theta)$ obtained by inputting 360 mm as a mean diameter and 0.12 as P to the equation (1) of the present invention, according to a change of $\theta$.

The actual curve can be obtained by calculating the values of L at every angle of 5° between the warp direction and the weft direction, plotting the obtained values of L on a pattern drawing, and connecting the obtained points by the gently-sloping curve.

The obtained hollow weave woven fabric is scoured (at 90° C., for 20 minutes), dried (at 110° C., for 2 minutes) and heat set (at 180° C., for 2 minutes), and then a piece of the hollow weave woven fabric having the single layer weave binding band having a width of 20 mm is cut from the above finished woven fabrics. An opening for attaching the gas generator, having a diameter of 100 mm$\phi$, is provided at a center portion of one side woven fabric in the hollow portion and an outside peripheral portion of the opening is provided with a reinforcement cloth.

Air is blown into the hollow weave air bag, and then a withstanding pressure and a dimension in a plan view of the hollow portion of the air bag expanded at the internal pressure of 0.3 kgf/cm² are measured. The results are shown in Table 1. The volume of this air bag is 63 l.

EXAMPLE 2

Figure 7:
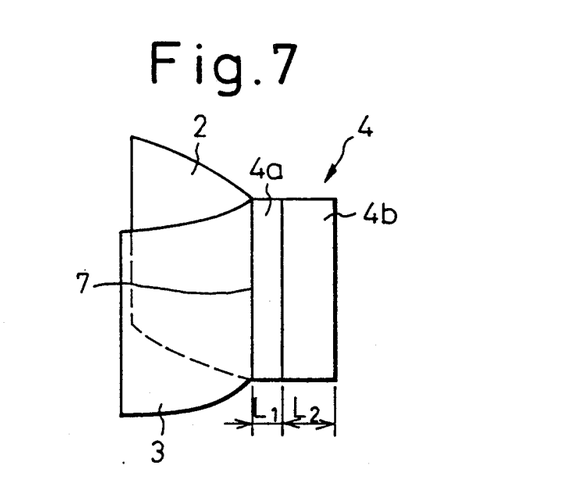
FIG. 7 is a perspective view showing an example of a single layer weave binding band of the hollow weave air bag according to the present invention.
Figure 8A:
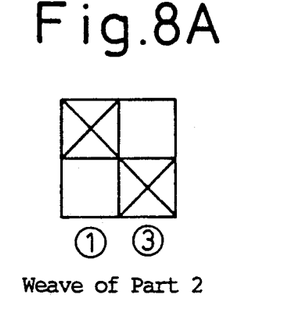
Figure 8B:
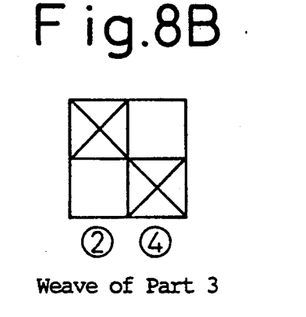
Figure 8C:
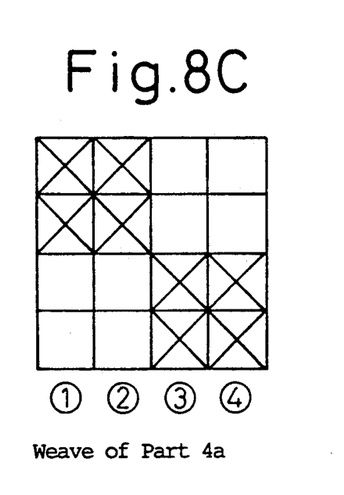
Figure 8D:
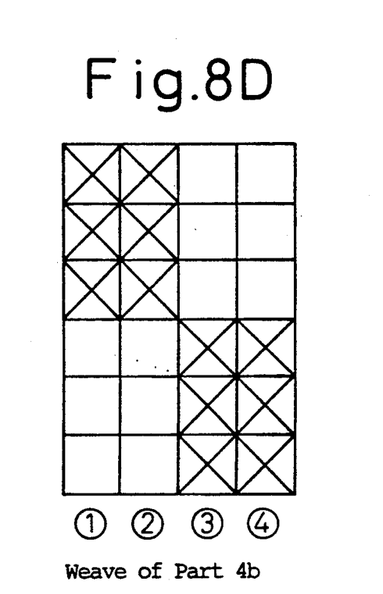

The air bag of example 2 is formed under the same conditions as for the air bag obtained in example 1, except that a single layer weave binding band 4 of the peripheral portion is divided into a portion 4a and a portion 4b, as shown in FIG. 7, matt weave is used as a weave of the portion 4a adjacent to the boundary line 7, as shown in FIG. 8C, a ⅝ fancy rib weave is used as a weave of the portion 4b continuing to the portion 4a, as shown in FIG. 8D, and the value P is determined as 0.06. A withstanding pressure of the obtained hollow weave air bag and a dimension in a plane view of the hollow portion of the air bag expanded at an internal pressure of 0.3 kgf/cm² are measured. The results are shown in Table 1.

COMPARATIVE EXAMPLE 1

The air bag of the comparative example 1 is formed under the same conditions as for the air bag obtained in example 1, except that another condition is determined so that hollow portion having substantially circular configuration (R = 360 mm, P = 0) and the volume of 63 l is formed by the weaving machine with the jacquard mechanism, and the obtained woven fabric is scoured, dried and heat set.

A hollow weave air bag having a single layer weave binding band of 20 mm is cut from the above woven fabric. In the same way as for example 1, the opening for attaching the gas generator with the reinforcement cloth is provided, and similar to example 1, a withstanding pressure of the obtained hollow weave air bag and a dimension in a plan view of the hollow portion of the air bag expanded at the internal pressure of 0.3 kgf/cm² are measured. The results are shown in Table 1.

COMPARATIVE EXAMPLE 2

Under conditions similar to those used in example 1, a hollow weave air bag having an R of 360 mm and a P of 0.22 was formed. A withstanding pressure of the obtained hollow weave air bag and a dimension in a plan view of the hollow portion of the air bag expanded at the internal pressure of 0.3 kgf/cm² were measured. The results are shown in Table 1.

As can be clearly seen from the results of Table 1, with regard to the configuration of the hollow portion in the plan view, the configuration of the hollow portion in the example 1 is a squared circle having concave corners in bias directions, but the configuration of the hollow portion in the example 2 is substantially a circle, and the withstanding pressure of both hollow weave air bags in the examples 1 and 2 is higher than that of the comparative example 1. Further when the length in the bias direction is made too short, as shown in the comparative example 2, the withstanding pressure of the air bag is lowered.

CAPABILITY OF EXPLOITATION IN INDUSTRY

The withstanding pressure of the hollow weave air bag can be remarkably improved by the present invention, compared with the conventional known hollow weave air bag. Further, since the present invention can be implemented, by only a modification of the design, in the manufacture of the known hollow weave air bag, an enhanced performance of the air bag can be obtained with the same production cost. Accordingly, the hollow weave air bag according to the present invention can be usefully utilized as an air bag for the driver's seat of a vehicle.

TABLE 1

|  |  | Dimension at hollow portion (mm) | | | | | | | | |
|---|---|---|---|---|---|---|---|---|---|---|
|  |  | Before expansion | | | | Expansion at 0.3 kgf/cm² | | | | Withstanding pressure (kgf/cm²) | Volume (l) |
|  | P | Dw | Df | Db$_1$ | Db$_2$ | Dw' | Df' | Db$_1$' | Db$_2$' | | |
| Example 1 | 0.12 | 765 | 767 | 677 | 676 | 595 | 593 | 531 | 534 | 2.42 | 63.5 |
| Example 2 | 0.06 | 741 | 742 | 699 | 700 | 564 | 567 | 569 | 570 | 2.23 | 63 |
| Comparative Example 1 | 0 | 720 | 720 | 719 | 719 | 550 | 553 | 611 | 613 | 1.81 | 63 |
| Comparative Example 2 | 0.22 | 800 | 798 | 641 | 640 | 618 | 619 | 486 | 484 | 1.75 | 62.5 |

TABLE 1-continued

| | | Dimension at hollow portion (mm) | | | | | | | | Withstanding pressure (kgf/cm²) | Volume (l) |
|---|---|---|---|---|---|---|---|---|---|---|---|
| | | Before expansion | | | | Expansion at 0.3 kgf/cm² | | | | | |
| | P | Dw | Df | Db$_1$ | Db$_2$ | Dw' | Df' | Db$_1$' | Db$_2$' | | |
| Example 2 | | | | | | | | | | | |

Note
Dw, Dw': Diameter in a warp direction
Df, Df': Diameter in a weft direction
Db$_1$, Db$_1$' and Db$_2$, Db$_2$: Diameter in a bias direction

We claim:

1. A hollow weave air bag having a peripheral portion of a hollow portion which is bound by a single layer weave binding band, characterized in that a boundary line between the peripheral portion and the single layer weave binding band is formed with different lengths from a center of the hollow portion to the boundary line in such a manner that the length has a maximum value in a warp direction and a weft direction of the hollow weave air bag and a minimum value in a bias direction thereof, and is further formed substantially along an wavy continuous curve expressed by the following equation between a circumscribed circle and an inscribed circle of the boundary line:

$$L = R(1 + P/2 \times \cos 4\theta) \quad (1)$$

$$0 < P \leq 0.2 \quad (2)$$

wherein R stands for a mean value of a radius of the circumscribed circle and a radius of the inscribed circle;

P stands for a ratio of a difference between the radius of the circumscribed circle and the radius of the inscribed circle against the mean radius R;

$\theta$ stands for an angle measured in a clockwise direction from the warp direction;

L stands for a length from the center C of the hollow portion to the boundary line at the angle $\theta$.

2. A hollow weave air bag according to claim 1, characterized in that lengths of straight lines within said boundary line in plan view extending through a center of the hollow portion of said air bag are substantially equal to each other in a warp direction, in a weft direction and in two bias directions, when said air bag is expanded at an internal pressure of 0.3 kgf/cm².

3. A hollow weave air bag according to claim 1, characterized in that an opening for attaching a gas generator is arranged in the hollow portion of said air bag.

4. A hollow weave air bag according to claim 1, characterized in that a resin layer is provided on at least part of said air bag.

5. A hollow weave air bag according to claim 1, characterized in that at least a part of said single layer weave binding band is formed by a matt weave.

6. A hollow weave air bag according to claim 5, characterized in that a weave of an area adjacent to the boundary line in the single layer weave binding band is a matt weave, and an area outside of said area formed by the matt weave is formed by a weave in which a warp and a weft is constituted by a weave having a lower restriction compared with that of the matt weave.

* * * * *